(12) United States Patent
Gehring et al.

(10) Patent No.: US 7,204,504 B2
(45) Date of Patent: Apr. 17, 2007

(54) PROCESS FOR COUPLING A TRAILER TO A MOTOR VEHICLE

(75) Inventors: Ottmar Gehring, Kernen (DE); Harro Heilmann, Ostfildern (DE); Frederic Holzmann, Stuttgart (DE); Andreas Schwarzhaupt, Landau (DE); Gernot Spiegelberg, Heimsheim (DE); Armin Sulzmann, Oftersheim (DE)

(73) Assignee: DaimlerChrysler AG, Stuttgart (DE)

( * ) Notice: Subject to any disclaimer, the term of this patent is extended or adjusted under 35 U.S.C. 154(b) by 52 days.

(21) Appl. No.: 11/156,197

(22) Filed: Jun. 17, 2005

(65) Prior Publication Data

US 2006/0071447 A1 Apr. 6, 2006

(30) Foreign Application Priority Data

Jun. 17, 2004 (DE) .................... 10 2004 029 130

(51) Int. Cl.
    *B60D 1/36* (2006.01)
(52) U.S. Cl. ..................................... 280/477
(58) Field of Classification Search ................ 280/477, 280/434, 504
    See application file for complete search history.

(56) References Cited

U.S. PATENT DOCUMENTS

| 5,195,328 | A | * | 3/1993 | Davis | 62/117 |
| 5,455,557 | A | * | 10/1995 | Noll et al. | 340/431 |
| 5,951,035 | A | * | 9/1999 | Phillips et al. | 280/477 |
| 6,120,052 | A | * | 9/2000 | Capik et al. | 280/477 |
| 6,222,457 | B1 | * | 4/2001 | Mills et al. | 340/686.1 |
| 6,581,695 | B2 | * | 6/2003 | Bernhardt et al. | 172/439 |
| 6,970,184 | B2 | * | 11/2005 | Hirama et al. | 348/148 |
| 2005/0046147 | A1 | * | 3/2005 | Piper et al. | 280/477 |

* cited by examiner

*Primary Examiner*—Tony Winner
(74) *Attorney, Agent, or Firm*—Akerman & Senterfitt; Stephan A. Pendorf; Yonghong Chen

(57) ABSTRACT

In the case of a method for hitching a trailer (2) to a motor vehicle (1), in particular a semitrailer to a semitrailer towing machine, an image sensor (5) is provided which is arranged in a hitching region (6) in such a manner that image data of the hitching region (6) are recorded. During the approach of the motor vehicle (1) to the trailer (2), stored model data of the hitching region (6) of the trailer (2) are segmented in the image data recorded by the image sensor (5) and are in each case placed in the correct position in the image data. A target zone (9) for the hitching is determined therefrom. The arrangement of the target zone (9) in the image data is used as a measurement for a steering operation of the motor vehicle (1) during hitching.

8 Claims, 1 Drawing Sheet

PROCESS FOR COUPLING A TRAILER TO A MOTOR VEHICLE

BACKGROUND OF THE INVENTION

1. Field of the Invention

The invention relates to a method for hitching a trailer to a motor vehicle, in particular a semitrailer to a semitrailer towing machine, having an image sensor which is arranged in a hitching region in such a manner that image data of the hitching region are recorded.

2. Related Art of the Invention

U.S. 2002/0149673 A1 discloses an image display method for a rear camera for depicting an image, the camera being attached to a motor vehicle and the image taken by the camera being depicted to the driver of the motor vehicle on a screen. An additional subsidiary line image which likewise shows the rear region of the motor vehicle is superimposed on the image taken by the camera of the motor vehicle and transmitted to the screen. The subsidiary line image has a spacing marking. It is thereby possible to move the motor vehicle rearwards in such a manner that the target position of the motor vehicle can be reached. Similarly, when the subsidiary line image is used, the motor vehicle can be moved backwards in such a manner that a trailer device of the motor vehicle can be hitched to a trailer.

However, drawbacks with this manner of hitching a trailer to a motor vehicle include the fact that the moment of hitching and the braking operation of the motor vehicle cannot be exactly determined.

SUMMARY OF THE INVENTION

It is therefore the object of the invention to provide a method for hitching a trailer to a motor vehicle, in particular a semitrailer to a semitrailer towing machine, which enables the trailer to be hitched to the motor vehicle precisely and rapidly.

According to the invention, during the approach of the motor vehicle to the trailer, use is made of stored model data of the hitching region of the trailer in order to segment the said model data in the image data recorded by the image sensor, i.e. the structures corresponding to the model data are detected and located in the image. The stored model data of the hitching region are placed in the correct position in the image data. A target zone for hitching the motor vehicle to the trailer is then determined from this "superimposition" of the model data with the image data. The arrangement of the target zone in the image data is therefore used as a measurement for a steering operation of the motor vehicle during hitching to the trailer.

The image sensor may be, for example, a camera which can be sensitive both in the infrared and in the visible spectrum. In addition to 2D image sensors, image-providing sensors which can record 3D information are also suitable. These include, for example, laser scanners, radar sensors and ultrasound sensors.

In this case, the distance between the motor vehicle and the trailer may be recorded directly by a 3D image sensor or by means of 2D image sensors in a stereo arrangement. There is also the possibility here, after an initial distance measurement or distance estimation, of incorporating odometry data.

In one advantageous refinement of the invention, provision can be made for the motor vehicle to approach the trailer until the target zone in the image has reached a predetermined size, with, when the predetermined size of the target zone is reached, a braking operation of the motor vehicle being initiated manually or via an automatic control unit.

An automatic braking operation after hitching that is automatically initiated by a control unit, which intercepts a signal, is particularly advantageous. In this case, the image sensor outputting the signal can be advantageously integrated into the trailer hitch of the motor vehicle, so that a signal is immediately output when the motor vehicle is hitched to the trailer.

If, in a further advantageous refinement of the invention, provision is made for the hitching operation to be depicted for a driver of the motor vehicle on a display, then easier monitoring of the hitching operation by the driver is possible who, as a result, can more easily control steering operations of the motor vehicle or the hitching operation.

Further advantageous refinements of the invention emerge from the rest of the subclaims. Exemplary embodiments of the invention are represented in principle below.

DETAILED DESCRIPTION OF THE INVENTION

Figure 1:
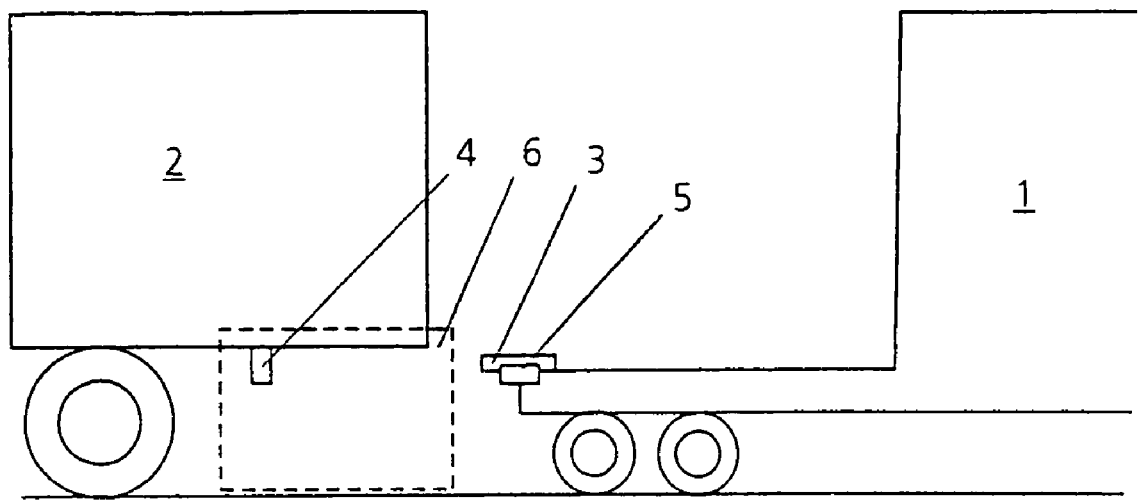
FIG. 1 shows a diagrammatic illustration of a motor vehicle, in particular a semitrailer towing machine, during the hitching operation to a trailer, in particular a semitrailer.

FIG. 1 illustrates a motor vehicle 1, which is designed as a semitrailer towing machine, before it is hitched to a trailer 2, here a semitrailer. The semitrailer towing machine 1 has to be moved backwards for hitching to the semitrailer 2, the steering wheel angle being changed in such a manner that the semitrailer towing machine 1 is directly in front of the semitrailer 2 and can be moved to the semitrailer 2 without excessive steering. The semitrailer towing machine 1 has a trailer hitch or a fifth wheel 3 for hitching it to the semitrailer 2. A hitch element 4, which is designed as a kingpin and is attached to a lower side of the semitrailer 2, is placed into the fifth wheel 3 in order to hitch the semitrailer 2 to the semitrailer towing machine 1. An image sensor 5, for example a camera, is arranged in one region of the trailer hitch 3. In this exemplary embodiment, the image sensor 5 is arranged slightly below the trailer hitch 3, with the image sensor 5 picking up image data directed rearwards or images of a hitching region 6. The image sensor 5 may, of course, also be integrated in the trailer hitch 3 and/or may be activated automatically. This is advantageous to the effect that the kingpin 4 can be detected substantially more easily than if the image sensor 5 is attached to the side of the trailer hitch 3. The image sensor 5 delivers in real time an image of the hitching region 6, which image is fed to a control unit which is provided in the semitrailer towing machine 1. The software of the control unit, with it being possible for standard software to be used, operates in two steps. In this connection, the kingpin 4 of the semitrailer 2 is detected by means of the image sensor 5 and the travel controlled in order to reach this target. Since there is very little light in the hitching region 6, it is not immediately possible to detect the kingpin 4. Previously known methods, such as, for example, image segmentation, are suitable in this case only to a limited extent, since, after the image taken by the image sensor 5 has been derived, there are initially a great number of individual contours in the image and these have to undergo a complex filtering process. In addition, constant lighting conditions are required. The software of the control unit therefore operates with a model, which has been prepared previously of the inserted semitrailer 2, is therefore known and has been stored. Different models can be used depending on the type of semitrailer 2.

Figure 2:
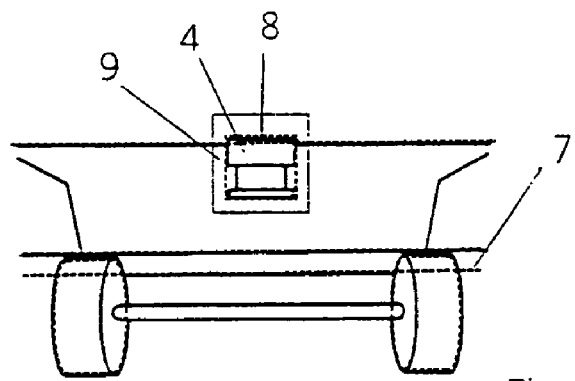
FIG. 2 shows a basic illustration of an image of a hitching region, which image has been taken by an image sensor.

The model of the semitrailer 2, which has only the most important contours or lines (model data) of the semitrailer 2, is, according to FIG. 2, integrated into the image of the hitching region 6, which image has been taken by the image sensor 5, so that, for example, as in FIG. 2, the contours of the wheels are superimposed with the wheels of the image taken. Model data may be, for example, the axle with the wheels, only the wheels or else only supports of the semitrailer 2. The model of the semitrailer 2 is provided with the reference number 7 and is illustrated by the dashed lines. In order to place the model 7 in the image which has been taken, use can be made of a known image processing algorithm. If the depicted contours of the model 7 precisely overlap with the regions depicted in the image, it is then precisely known where the kingpin 4 is in the image. The detected region of the kingpin 4 is depicted in FIG. 2 by the reference number 8. A region 9 which contains the target is established by means of the image processing algorithm. This region 9 comprises a relatively large sector around the kingpin 4 and is referred to as the target zone.

Figure 3:
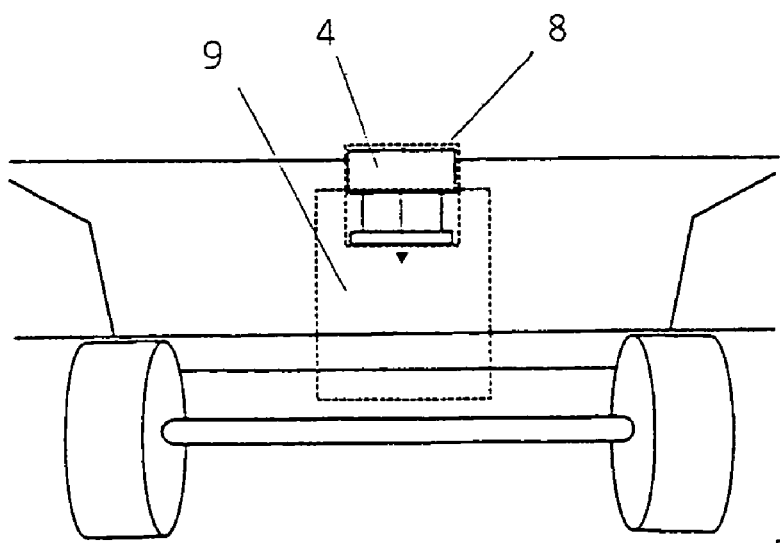
FIG. 3 shows a basic illustration of a following image of a hitching element, which image has been taken by the image sensor, where the distance between the trailer and the motor vehicle has been reduced.

During the slow movement of the semitrailer towing machine 1 towards the semitrailer 2, the region 8 depicting the kingpin 4 has to be enlarged as the distance between the semitrailer towing machine 1 and semitrailer 2 becomes smaller, since the kingpin 4 becomes larger the closer the semitrailer towing machine comes to the semitrailer 2, as is depicted in FIG. 3. The region 8 likewise has to be centred again in the image during the approach in order to subsequently be hitched correctly. In this case, the zone 9 depicts the target zone of the region 8, which means that the region 8 corresponds in its position to the zone 9 during hitching of the semitrailer towing machine 1 to the semitrailer 2. The target of the region 8 is therefore centred in the image. The deviation between the centre of the image recording in the horizontal direction and the centre of the region 8 in the horizontal direction is read here as an error. For the positionally correct centring of the region 8 with respect to the target zone 9, the desired value and the actual value of the image 8 are determined, with the desired value 0 being set and the actual value constituting the error which has to be corrected. Use is preferably made of a PID controller for the correction.

As already mentioned, the region 8 of the kingpin 4 moves and is enlarged as the semitrailer towing machine 1 approaches the semitrailer 2. The new position and the enlargement factor of the region 8 are determined for each image by means of the control unit. Since the images are recorded very rapidly one after another, the difference between consecutive image recordings is small. For this reason, the image processing algorithm compares the image of the region 8 that has been taken last with an initial image of the region 8. The image of the kingpin 4 is derived in each case after each recording and filtered together with a threshold value. In this connection, the threshold value can be determined, for example, empirically or varied by means of an adaptive threshold until an optimum result is displayed.

In this case, the derivation of the image is calculated, for example, with the Sobel operator. The Sobel operator reinforces structures in images and operates with a convolution mask which has, for example, a matrix with 5×5 elements that is slid over the input image. The matrix enables the environment of the pixel which is situated under the centre point of the matrix to be observed. In this case, the pixel of the input image is multiplied with the value in the corresponding matrix cell and the products added up. The total constitutes the greyscale value of the pixel in the centre of the matrix. This value is plotted into the filtered image. Depending in each case on the choice of matrix elements, horizontal, vertical or diagonal edges can be determined. By means of the Sobel operator, good results can be obtained in low-contrast images which are present here. Only the absolute value of the derivative is stored. The target zone of a following image is extracted with a greater width and a greater height with the use of an enlargement factor. In this case, the enlargement factor can be fixedly predetermined or established on the basis of distance values, with the distance values being recorded directly by means of the image sensor 5 and/or determined by calculation on the basis of odometry data (steering angle, wheel revolutions, . . . ). The extracted zone is likewise derived and filtered. The change in movement and enlargement of the region 8 is determined by an ICP (iterative closest point) algorithm. In this case, first of all the two images are superimposed and, for each pixel, the distance from its closest neighbour in the preceding image is calculated. The overall change is then calculated for the newly produced image. In this connection, the individual changes for each axis (x- and y-axis) and for the enlargement of each pixel are totted up.

The position of the new region 8 due to movement and enlargement in the image is P. The deviation between the first image and the second image is referred to as e and the iteration steps bear the reference n. The next correction c therefore has to be defined as: $P_{n+1}=P_n-c$. In this case, the Jacobian matrix is as follows:

$$J_{ij} = \frac{\delta e_i}{\delta c_j}.$$

By means of linear approximation, the following formula is obtained:

$$J \cdot c = e$$

The optimum movement factor should therefore satisfy the norm $\|J \cdot c - e\|^2$. The method is stabilized and has an overdriven convergence. A new vector is calculated until there are no longer any possibilities of improvement. The software of the control unit therefore "knows" the movement and the enlargement. The movement is used in order to monitor and to extract the new region 8, with the enlargement being used in order to select the new width and height of the region 8 in the image.

When the region 8 which contains the kingpin 4 is matched to the zone 9 and there are therefore no longer any possibilities of improvement, the hitching of the semitrailer towing machine 1 to the semitrailer 2 can take place, with the kingpin 4 being moved or inserted automatically into the trailer hitch 3. For example, at least one sensor is provided on a wall of the trailer hitch 3 and transmits signals per CAN bus to a control unit of the driver train (power train controller), as a result of which a braking operation is immediately initiated. The braking operation can be undertaken automatically by means of a further control unit which blocks the brakes of the semitrailer towing machine 1 after hitching. However, it is also possible for the sensor to transmit a signal to the driver of the semitrailer towing machine 1 who then initiates the braking operation.

The hitching system may be activated by the driver in the driver's cab of the semitrailer towing vehicle 1 by pushing a button, by radio remote control or by a control station (also by radio).

It is also possible for the driver of the semitrailer towing machine 1 to monitor and control the hitching operation via a display in the driver's cab, with the control unit making the images which have been taken by the image sensor 5 and the superimposed models accessible to the driver on the display. The driver can thereby precisely monitor the hitching operation.

The invention claimed is:

1. A method for hitching a trailer to a motor vehicle, comprising:
    arranging an image sensor in a hitching region in such a manner that image data of the hitching region are recorded,
    segmenting, during the approach of the motor vehicle (1) to the trailer (2), stored model data of the hitching region (6) of the trailer (2) in the image data recorded by the image sensor (5) and in each case placing data in the correct position in the image data, and
    determining a target zone (9) for the hitching therefrom, the arrangement of the target zone (9) in the image data being used as a measurement for a steering operation of the motor vehicle (1) during hitching.

2. The method according to claim 1, wherein the motor vehicle (1) approaches the trailer (2) until the target zone (9) in the image has reached a predetermined size, with, when the predetermined size of the target zone (9) is reached, a braking operation of the motor vehicle (1) being initiated manually or via an automatic control unit.

3. The method according to claim 1, wherein, during hitching of the motor vehicle (1) to the trailer (2), at least one sensor outputs a signal so that a braking operation of the motor vehicle (1) is initiated.

4. The method according to claim 1, wherein the image sensor (5) is activated automatically.

5. The method according to claim 1, wherein the image of the target zone (9) is derived and filtered with a threshold value.

6. The method according to claim 1, wherein the hitching operation is depicted for a driver of the motor vehicle (1) on a display.

7. The method according to claim 1, wherein an axle with wheels, wheels or supports of the trailer (2) are used as model data.

8. The method as in claim 1, wherein said trailer is a semi-trailer and said motor vehicle is a semi-tractor.

* * * * *